(12) United States Patent
Gamboa et al.

(10) Patent No.: US 10,755,159 B1
(45) Date of Patent: *Aug. 25, 2020

(54) FINANCIAL SERVICES CARDS INCLUDING BRAILLE

(71) Applicant: United Services Automobile Association (USAA), San Antonio, TX (US)

(72) Inventors: Marco Antonio Gamboa, San Antonio, TX (US); Ronald Richard Watkins, Boerne, TX (US); Patrick Sturdivant, San Antonio, TX (US); Martha Rodriguez Hathorn, San Antonio, TX (US); Stephen Adam Cone, Boerne, TX (US); Rhealyn Nicole Yanta, Poth, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/549,713

(22) Filed: Aug. 23, 2019

Related U.S. Application Data

(63) Continuation of application No. 16/119,483, filed on Aug. 31, 2018, now Pat. No. 10,438,107.

(51) Int. Cl.
*G06K 19/077* (2006.01)

(52) U.S. Cl.
CPC ............... *G06K 19/0772* (2013.01)

(58) Field of Classification Search
None
See application file for complete search history.

(56) References Cited

U.S. PATENT DOCUMENTS

| | | | | |
|---|---|---|---|---|
| 4,404,764 A | * | 9/1983 | Wills | B42D 15/02 229/92.8 |
| D578,159 S | * | 10/2008 | Hachey | B42D 25/22 D19/10 |
| 7,793,834 B2 | * | 9/2010 | Hachey | B42D 25/00 235/379 |
| 2009/0200385 A1 | * | 8/2009 | Hachey | G06K 19/06 235/494 |

FOREIGN PATENT DOCUMENTS

| | | |
|---|---|---|
| JP | 2004/082336 | 3/2004 |
| JP | 2004/230767 | 8/2004 |

* cited by examiner

*Primary Examiner* — Christle I Marshall
(74) *Attorney, Agent, or Firm* — Fish & Richardson P.C.

(57) ABSTRACT

Implementations of the present disclosure include a financial services card including a card substrate, and multiple rows of braille-encoded characters formed on the card substrate, at least a portion of the braille-encoded characters encoding an account number that is associated with the financial services card being distributed between a first row and a second row of the multiple rows, and additional information associated with the financial services card being braille-encoded in a third row.

19 Claims, 5 Drawing Sheets

FINANCIAL SERVICES CARDS INCLUDING BRAILLE

CROSS-REFERENCE TO RELATED APPLICATION

This application is a continuation application of and claims priority to U.S. application Ser. No. 16/119,483, filed on Aug. 31, 2018, the entire contents of which is incorporated by reference herein.

BACKGROUND

Financial services cards can include credit cards, debit cards, and automated teller machine (ATM) cards, which include information recorded thereon. Example information can include an account number, a cardholder name, a valid thru date (e.g., month after which the card expires), a security code, and the like. Information can be physically recorded on the card in the form of printed text that can be read from the card.

Persons with disabilities, such as full or partial blindness may be unable to visually read information from a card. Although braille is an option for recording information on a card, standard braille format conflicts with the limited space available on financial services cards, particularly cards that include other features, such as electronic chips.

SUMMARY

Implementations of the present disclosure are directed to financial services cards. More particularly, implementations of the present disclosure are directed to financial services cards including braille.

In some implementations, a financial services card includes a card substrate, and multiple rows of braille-encoded characters formed on the card substrate, at least a portion of the braille-encoded characters encoding an account number that is associated with the financial services card being distributed between a first row and a second row of the multiple rows, and additional information associated with the financial services card being braille-encoded in a third row. Other implementations include corresponding systems, apparatus, and computer programs, configured to perform the actions of the methods, encoded on computer storage devices.

These and other implementations may each optionally include one or more of the following features: each row of the multiple rows comprises fourteen cells, each cell of the first row including a braille-encoded character; a first cell of the first row includes a braille-encoded number symbol indicating that at least a portion of the braille-encoded characters of the first row include numbers; a distance between braille-encoded characters in each of the first row, the second row, and the third row is approximately 0.230 inches; a distance between centerlines of the multiple rows is approximately 0.325 inches; the first row, the second row, and the third row are located within a half of the card substrate; the card comprises physical dimensions that conform to the ISO/IEC 7810 ID-1 format; the additional information associated with the financial services card braille-encoded in a third row comprises a security code; the braille-encoded information provided in the second row further includes a valid thru date.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
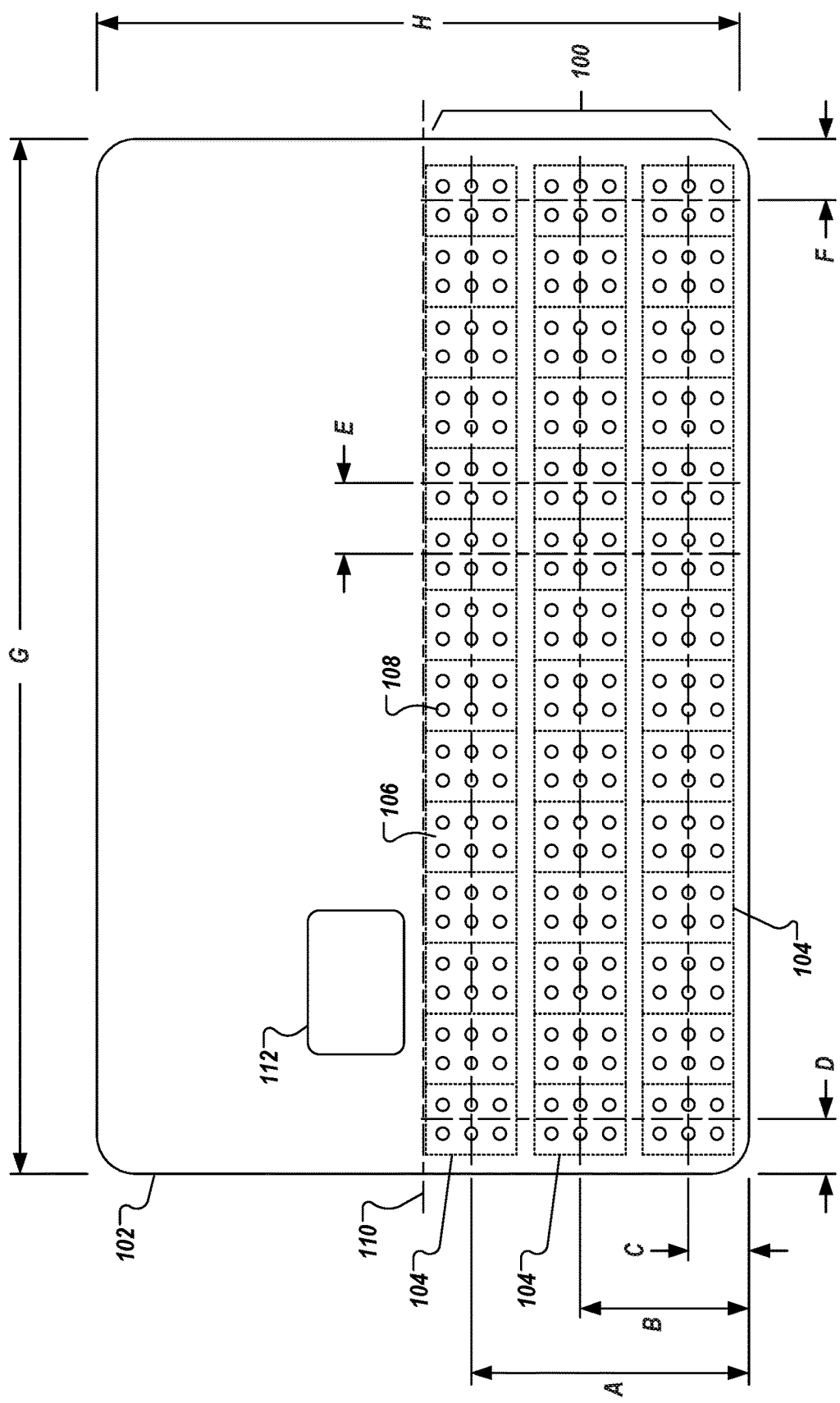
FIG. 1 depicts an example braille template for a financial services card in accordance with implementations of the present disclosure.

Implementations of the present disclosure are directed to financial services cards. More particularly, implementations of the present disclosure are directed to financial services cards including braille. In some implementations, financial services cards of the present disclosure provide braille layouts that improve readability, and content density within relatively sparse space provided on financial services cards. In some implementations, a financial services card includes a card substrate, and multiple rows of braille-encoded characters formed on the card substrate, at least a portion of the braille-encoded characters encoding an account number that is associated with the financial services card being distributed between a first row and a second row of the multiple rows, and additional information associated with the financial services card being braille-encoded in a third row.

To provide further context for implementations of the present disclosure, financial services cards can include, without limitation, credit cards, debit cards, and automated teller machine (ATM) cards. In some implementations, financial services cards include record information thereon. Example information can include, without limitation, an account number, a cardholder name, a valid thru date (e.g., month after which the card expires), a security code, and the like. In some examples, information is physically recorded on the card. For example, information can be recorded as printed text that can be read from the card. In some examples, the printed text is embossed on the card. In some examples, information is magnetically recorded on the card. For example, a card can include a magnetic strip, from which information can be read (e.g., by a card reader). In some examples, information is electronically recorded on the card. For example, a card can include an electronic chip (e.g., a Europay, Mastercard, and Visa (EVM) chip), from which information can be read (e.g., by a chip reader).

It often occurs that a person must determine information from a card. For example, a person might interact with an enterprise to order products, and/or services, and have to convey card information to the enterprise (e.g., verbally, textually). Consequently, the person may be required to read information from the card.

Persons with disabilities, such as full or partial blindness may be unable to visually read information from a card. Even though printed information may be also embossed on the card, it may be difficult or impossible for the person to accurately determine the information through touch of the embossing.

Although braille is an option for recording information on a card, standard braille format conflicts with the limited space available on financial services cards, particularly cards that include other features, such as electronic chips. For example, financial services cards include dimensions that generally conform to a standard. An example standard includes the ISO/IEC 7810 Identification Cards standard, which is an international standard that defines the physical characteristics for identification cards. Example physical characteristics specified by ISO/IEC 7810 include, without limitation, physical dimensions, resistance to bending, flame, chemicals, temperature and humidity, and toxicity. In general, financial services cards should conform to the ID-1 format of ISO/IEC 7810. The ID-1 format specifies a size of 3.375 in. by 2.125 in. (approx. 85.60 mm by 53.98 mm), and rounded corners with a radius of approximately ⅛ in. (e.g., approx. 2.88 mm-3.48 mm).

The physical dimensions of the ID-1 format can be considered relatively limited in view of the amount of information to be physically recorded on the card. The space for recording such information is also reduced by other features of the card. For example, the presence of an electronic chip reduces the amount of physical space to record information. As another example, names, logos, and the like of institutions providing the cards (e.g., banks, credit card companies) further reduce the amount of physical space to record information.

In view of the relatively limited space for recording information on a card, recording information in braille can be impractical. Braille can be described as a system of touch reading and writing used by blind persons, and/or persons with extremely limited sight. Braille includes embossed dots that are evenly arranged in quadrangular letter spaces, called cells. Each cell includes up to six dots that are arranged in two columns of three dots. Braille is a fixed-width font meaning that every character occupies the same amount of space, regardless of how many dots are in the cell. Braille is read by touch, typically including passing a fingertip over the braille dots to tangibly discern characters encoded in the dots.

For braille to be read by a blind person, the dots of each cell must be easily discernible, and the distance between cells sufficient to distinguish between characters. For example, the size (e.g., diameter, height) of the dots must be sufficient to be easily distinguished from the background, and adjacent columns between cells sufficiently spread apart to discern between cells. There are multiple standards for the size and spacing of braille dots. For example, in the United States and Canada, Specification 800, "Braille Books and Pamphlets," from the National Library Service for the Blind and Physically Handicapped of the Library of Congress is considered to be the de facto standard. In general, the nominal height of braille dots is approximately 0.019 inches (e.g., approx. 0.48 mm), and the nominal base diameter of braille dots is approximately 0.057 inches (e.g., approx. 1.44 mm). With regard to intra-cell spacing, the nominal distance from center-to-center of adjacent dots (e.g., horizontally, vertically) is approximately 0.092 inches (e.g., approx. 2.340 mm). With regard to inter-cell spacing, the nominal distance from center-to-center of corresponding dots in adjacent cells is approximately 0.245 inches (e.g., approx. 6.2 mm). Further, the nominal line spacing of braille cells from center-to-center of the nearest corresponding dots in adjacent lines is approximately 0.400 inches (e.g., approx. 1.000 cm).

In view of the above-provided dimensions of cards, and braille dots, braille can be considered impractical for physically recording information on cards. For example, a typical account number includes sixteen characters (e.g., 4000 1234 5678 9010), which would require sixteen cells to record the characters. This would equal approximately 3.92 inches, which is greater than the 3.375 inch width of the card. Further, to discern that following cells include numbers, a braille number character (reversed "L") should be provided at the beginning of the string of cells, resulting in seventeen cells needed to record the sixteen numbers. In situations where an account number includes both letters and numbers, the string of cells may need to be even longer.

In view of this, implementations of the present disclosure provide a braille layout, and dimensions that enable practical recording of information in braille on financial services cards. Practical recording enables a person to accurately read, by touch, the information recorded in braille on the card. That is, the braille layout and dimensions of the present disclosure enables information to be recorded within the limited physical space, and in a manner that characters can be readily discerned through touch-reading. Further, the braille layout and dimensions of the present disclosure enables a sufficient amount of information to be physically recorded on the card, even in view of the limited space, to enable a person to conduct a transaction based on the information touch-read from the card.

FIG. 1 depicts an example braille template 100 for a financial services card 102 in accordance with implementations of the present disclosure. The financial services card 102 includes a card substrate that conforms to the ISO/IEC 7810 ID-1 format. As depicted in FIG. 1, the braille template includes three rows 104 of braille cells 106. Each row 104 includes fourteen braille cells 106. Each braille cell 106 includes six locations 108 for provisioning braille dots. Accordingly, the braille template 102 defines where up to 252 braille dots can be located on the card 102.

In the depicted example, a centerline 110 of the card 102 is provided, and divides the card 102 into an upper half, and a lower half (as depicted in FIG. 1). In some implementations, the braille template 100 is entirely located within the lower half. For example, and as depicted in FIG. 1, an electronic chip 112 can be provided in the upper half, which would obstruct provision of braille dots in at least a portion of the upper half.

FIG. 1 depicts dimensions in accordance with implementations of the present disclosure. The depicted dimensions include dimension identifiers A, B, C, D, E, F, and G, and are summarized in the following table:

TABLE 1

Dimensions and Ranges

| ID | Name | Measure (in.) | Range (in.) |
| --- | --- | --- | --- |
| A | Braille Row 1 | 0.875 | +/− 0.025 |
| B | Braille Row 2 | 0.550 | +/− 0.025 |
| C | Braille Row 3 | 0.225 | +/− 0.025 |
| D | Left Margin | 0.200 | +/− 0.050 |
| E | Cell Spacing | 0.230 | +/− 0.06 |
| F | Right Margin | 0.188 | +/− 0.050 |
| G | Card Horizontal | 3.375 | see standard |
| H | Card Vertical | 2.125 | see standard |

In accordance with Table 1, dimension A can range between 0.850 in. and 0.900 in., with a preferred measurement of 0.875 in., dimension B can range between 0.525 in. and 0.0575 in., with a preferred measurement of 0.550 in., dimension C can range between 0.200 in. and 0.250 in., with a preferred measurement of 0.225 in., dimension D can range between 0.150 in. and 0.250 in., with a preferred measurement of 0.200 in., dimension E can range between 0.224 in. and 0.236 in., with a preferred measurement of 0.230 in., and dimension F can range between 0.138 in. and 0.238 in., with a preferred measurement of 0.188 in.

In accordance with implementations of the present disclosure, information is recorded in braille dots within the braille template 100 of FIG. 1. In some implementations, the uppermost row 104 (the row 104 adjacent to the centerline 110) is used to record at least a portion of an account number associated with the card 102. The middle row 104 is used to record at least a portion of the account number. In some examples, the middle row 104 is also used to record additional information. For example, a valid thru date, a security code, and/or a type of card (e.g., credit, debit) can be recorded in the middle row 104. In some examples, the lowest row 104 (the row 104 adjacent to the bottom edge of the card 102) is used to record additional information. For example, a valid thru date, a security code, and/or a type of card can be recorded in the lowest row 104.

In some implementations, a hash character is encoded in braille immediately preceding a string of numbers (e.g., as a backwards "L"). In this manner, a braille reader can recognize that characters following the hash character are numbers, as opposed to letters. For example, a hash character can be encoded in the first cell 106 of the uppermost row 106, and the following cells can encode digits of an account number. In some examples, the uppermost row 104 records the first thirteen digits of the account number encoded in braille, and the middle row 104 includes braille-encodings of any remaining digits of the account number. For example, if the account number includes sixteen digits, the first cell 106 of the uppermost row 104 includes the braille-encoded hash character, the remaining thirteen cells 106 of the uppermost row 104 each include a braille-encoded digit, and the first three cells 106 of the middle row 104 each include a braille-encoded digit. In this manner, the account number is braille-encoded across the uppermost row 104, and the middle row 104.

In some implementations, if multiple types of information are encoded in the same row 104, one or more spaces are provided between encodings. Continuing with the example above, if a valid thru date is to be encoded in the middle row 104, it is encoded after the encodings of the remaining account number digits with at least one space therebetween.

In accordance with implementations of the present disclosure, the braille template 100 of FIG. 1 governs the location of braille dots in braille layouts embossed on financial services cards. Example layouts are described in further detail herein with reference to FIGS. 2A-3B. Overall, and in accordance with implementations of the present disclosure, the braille template 100 enables sufficient information to by braille-encoded on the card 102 to enable a person to conduct a transaction based on information touch-read from the card 102. That is, for example, the braille template of the present disclosure enables the account number, the valid thru date, and the security code to be braille-encoded within the limited space available, and without obstructing any other card features (e.g., electronic chip).

Figure 2A:
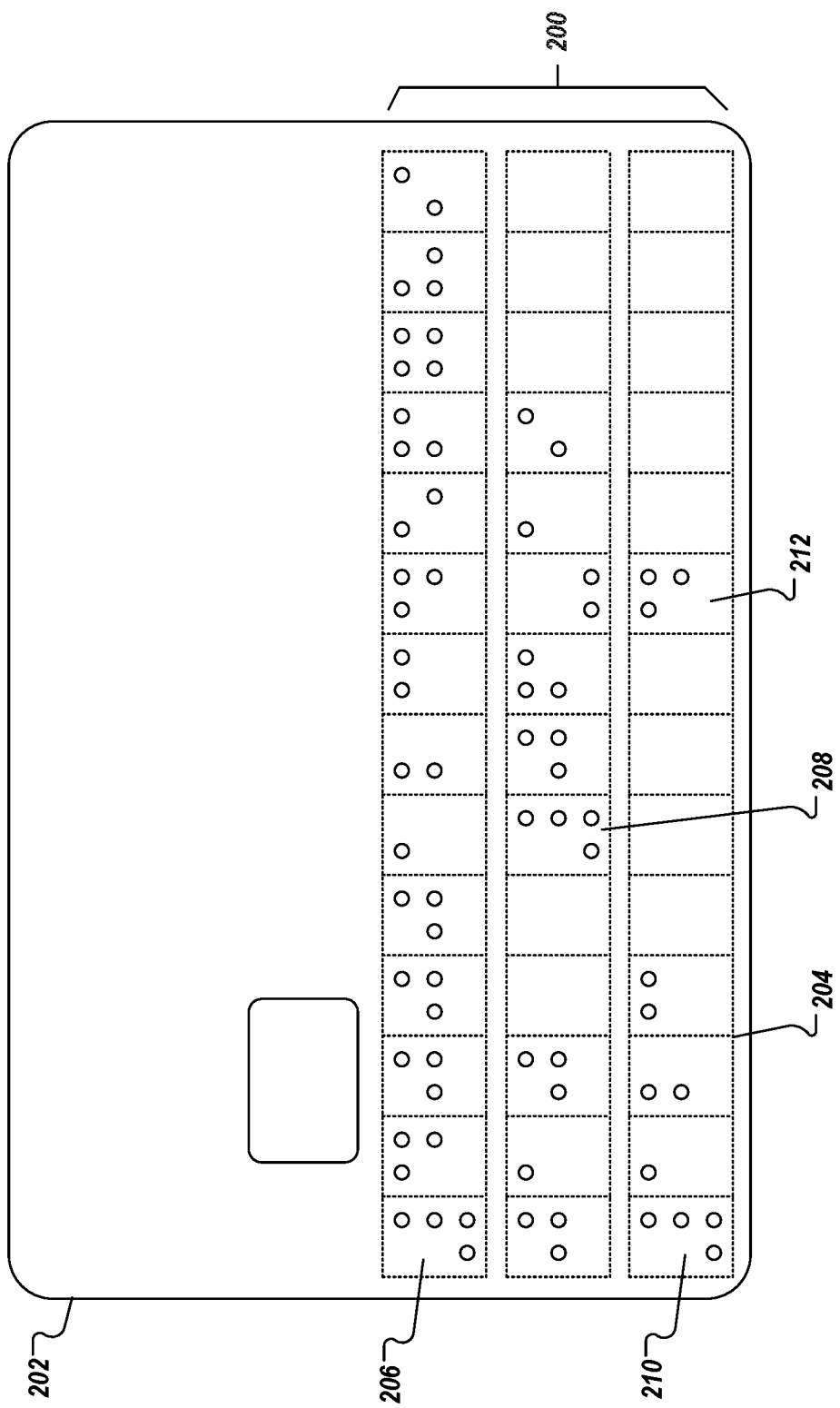
FIG. 2A depicts an example braille layout for a first example financial services card in accordance with implementations of the present disclosure.

FIG. 2A depicts an example braille layout 200 for a first example financial services card 202 in accordance with implementations of the present disclosure. For purposes of illustration, the example of FIG. 2A includes dashed lines 204 delineating rows and cells including braille encoding. It is contemplated, however, that the dashed lines 204 would not be printed, or otherwise appear on the card 202. In the example of FIG. 2A, an uppermost row of braille-encoded characters encode a portion of a sixteen digit account number (e.g., 4000 1234 5678 9010) associated with the card 202. For example, a first cell 206 encodes a hash character (#), which indicates that the subsequently following characters are numbers, as opposed to letters. The first three cells of the middle row encodes the last three digits of the account number.

In the example of FIG. 2A, a valid thru date (e.g., June 2019) is also encoded in the middle row. In the depicted example, two spaces are provided after the encoding of the last digit of the account number, and a cell 208 encodes a hash character (#), which indicates that the subsequently following characters are numbers, as opposed to letters. In the example of FIG. 2A, a security code (e.g., 123) is encoded in the lowest row. In the depicted example, a cell 210 encodes a hash character (#), which indicates that the subsequently following characters are numbers, as opposed to letters. In the example of FIG. 2A, a type of card (e.g., debit, credit) is also encoded in the lowest row. In the depicted example, multiple spaces are provided after the encoding of the security code, and a cell 212 encodes the letter D, which indicates that the card is a debit card, as opposed to a credit card.

Figure 2B:
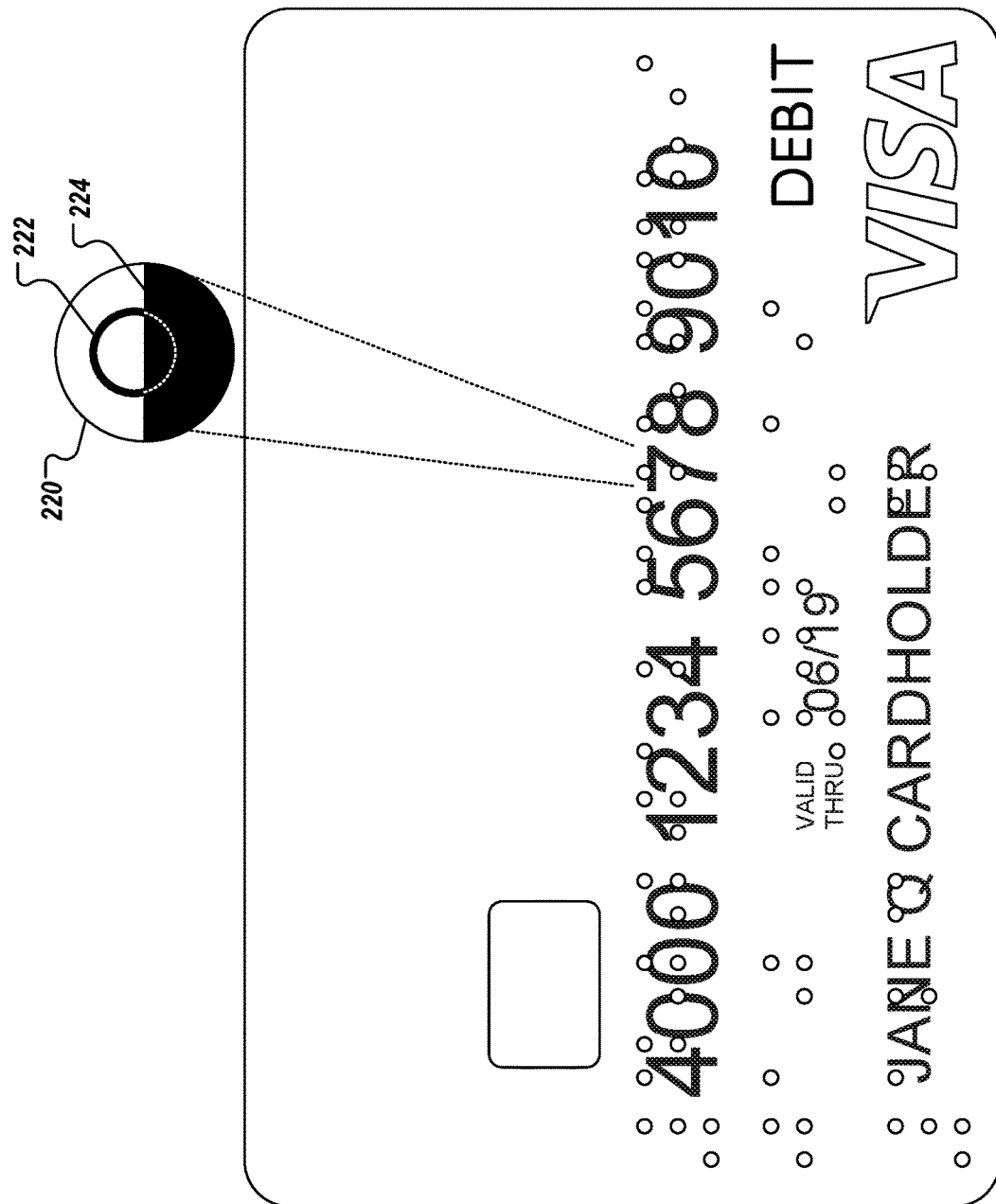
FIG. 2B depicts the first example financial services card of FIG. 2A including printed text.

FIG. 2B depicts the first example financial services 202 card of FIG. 2A including printed text. In the example of FIG. 2B, the printed text includes an account number (4000 1234 5678, 9010), a valid thru date (VALID THRU June 2019), and a name of the card holder (Jane Q Cardholder). The printed text of FIG. 2B also includes a card type (debit), and a logo of a credit card company (Visa). The account number overlays the braille dots of the uppermost row. Accordingly, while all sixteen digits of the account number overlay the uppermost row, the braille-encoded account number is distributed across multiple rows (e.g., the uppermost row and the middle row). An expanded view 220 of a braille dot 222 depicts how printed text 224 can at least partially overlay the braille dot 222. In this manner, the braille dots do not adversely impact readability of the printed text.

It can be noted that security codes are often printed on the back of the financial services cards. For example, in the example of FIG. 2B, printed text of a security code is absent from the view of the card 102. However, and as discussed above, the security code (e.g., 123) is braille-encoded on the card 102 in the lowest row. In this manner, information required to conduct a transaction can be touch-read from a single side of the card 102. Further, this obviates the need to have braille encoding on both sides of the card, which could adversely impact the thickness of the card.

Figure 3A:
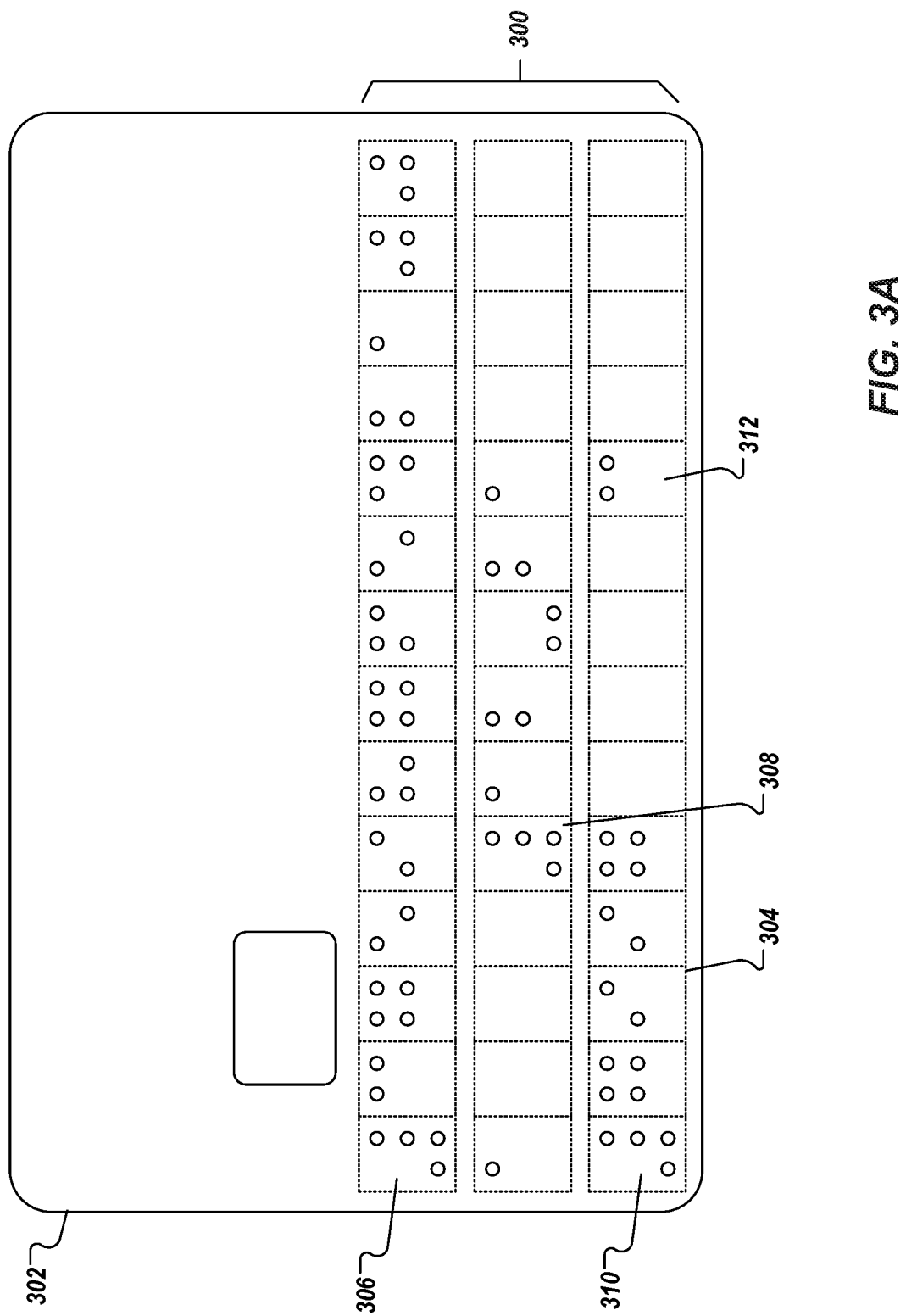
FIG. 3A depicts an example braille layout for a second example financial services card in accordance with implementations of the present disclosure.

FIG. 3A depicts an example braille layout 300 for a second example financial services card 302 in accordance with implementations of the present disclosure. As similarly described above with reference to FIG. 2A, and for purposes of illustration, the example of FIG. 3A includes dashed lines 304 delineating rows and cells including braille encoding. It is contemplated, however, that the dashed lines 304 would not be printed, or otherwise appear on the card 302. In the example of FIG. 3A, an uppermost row of braille-encoded characters encode a portion of a fourteen digit account number (e.g., 3759 87654 21001) associated with the card 302. For example, a first cell 306 encodes a hash character (#), which indicates that the subsequently following characters are numbers, as opposed to letters. The first cell of the middle row encodes the last digit of the account number.

In the example of FIG. 3A, a valid thru date (e.g., December 2021) is also encoded in the middle row. In the depicted example, three spaces are provided after the encoding of the last digit of the account number, and a cell 308 encodes a hash character (#), which indicates that the subsequently following characters are numbers, as opposed to letters. In the example of FIG. 3A, a security code (e.g., 7997) is encoded in the lowest row. In the depicted example, a cell 310 encodes a hash character (#), which indicates that the subsequently following characters are numbers, as opposed to letters. In the example of FIG. 3A, a type of card (e.g., debit, credit) is also encoded in the lowest row. In the depicted example, multiple spaces are provided after the encoding of the security code, and a cell 312 encodes the letter C, which indicates that the card is a credit card, as opposed to a debit card.

Figure 3B:
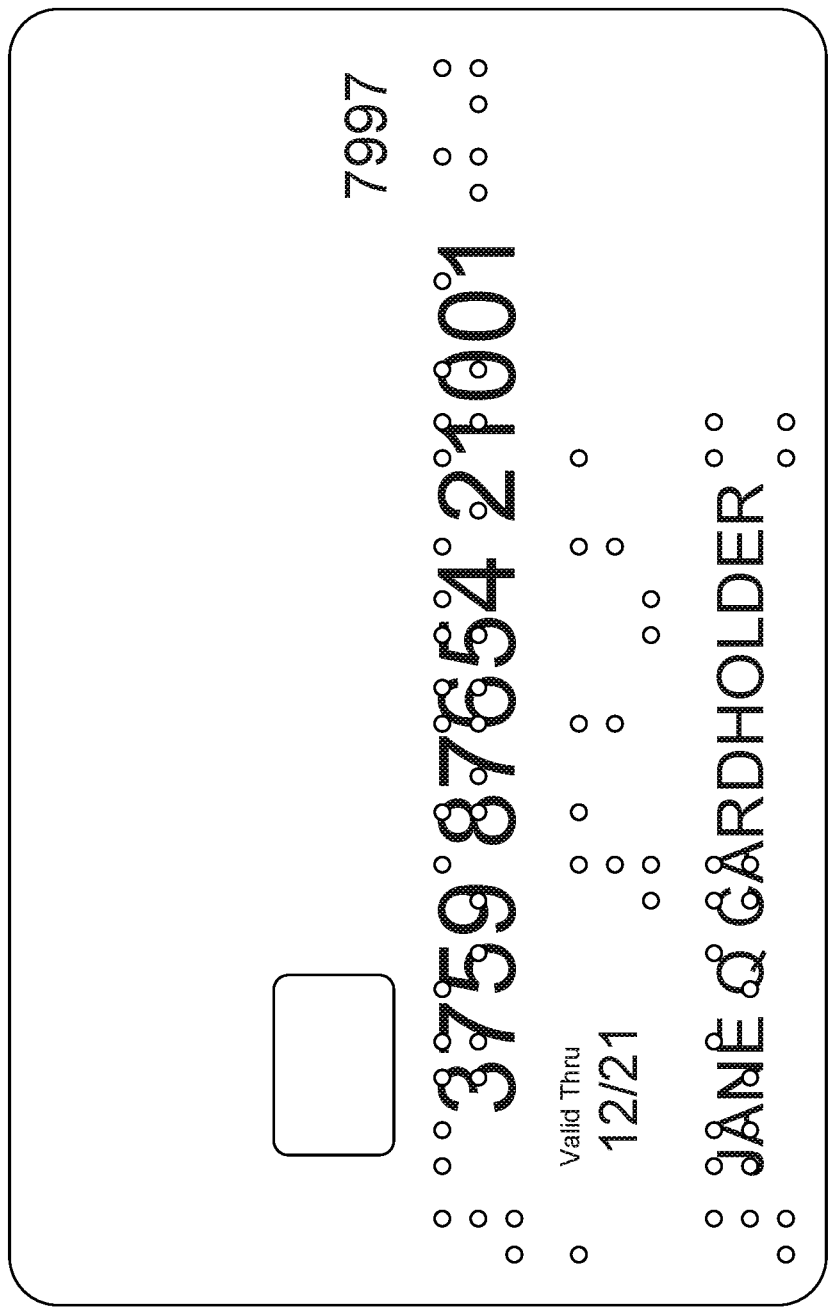
FIG. 3B depicts the second example financial services card of FIG. 3A including printed text.

FIG. 3B depicts the second example financial services 302 card of FIG. 3A including printed text. In the example of FIG. 3B, the printed text includes an account number (3759 87654 21001), a valid thru date (VALID THRU December 2021), a name of the card holder (Jane Q Cardholder), and a security code (7997). The account number overlays the braille dots of the uppermost row. Accordingly, while all fourteen digits of the account number overlay the uppermost row, the braille-encoded account number is distributed across multiple rows (e.g., the uppermost row and the middle row). As discussed above with reference to the expanded view 220 of FIG. 2B, the printed text can at least partially overlay the braille dots. In this manner, the braille dots do not adversely impact readability of the printed text.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A card, comprising:
   a type of card;
   a substrate;
   multiple rows of braille-encoded characters formed on the substrate, at least a portion of the braille-encoded characters encoding a plurality of numbers being distributed between a first row and a second row of the multiple rows; and
   a symbol being braille-encoded in at least one of the multiple rows indicating the type of card.

2. The card of claim 1, further comprising additional information being braille-encoded in a third row.

3. The card of claim 2, wherein the additional information comprises a date.

4. The card of claim 1, wherein the plurality of numbers comprise an account number.

5. The card of claim 1, wherein the card comprises a financial services card.

6. The card of claim 5, wherein the plurality of numbers comprises an account number that is associated with the financial services card.

7. The card of claim 1, wherein each row of the multiple rows comprises less than fifteen cells, each cell of the first row comprising a braille-encoded character.

8. The card of claim 7, wherein a first cell of the first row comprises a braille-encoded number symbol indicating that at least a portion of the braille-encoded characters of the first row comprise numbers.

9. The card of claim 1, wherein a distance between the braille-encoded characters in each of the first row and the second row is approximately 0.230 inches.

10. The card of claim 1, wherein a distance between centerlines of the multiple rows is approximately 0.325 inches.

11. The card of claim 1, wherein the first row and the second row are located within a half of the substrate.

12. The card of claim 1, wherein the card comprises physical dimensions that conform to the ISO/IEC 7910 ID-1 format.

13. The card of claim 1, further comprising an electronic chip.

14. The card of claim 1, further comprising a magnetic strip.

15. The card of claim 1, further comprising additional information being braille-encoded in the second row.

16. The card of claim 15, wherein the additional information comprises a date.

17. The card of claim 1, further comprising printed text embossed on the card.

18. A card, comprising:
   a substrate;
   multiple rows of braille-encoded characters formed on the substrate, at least a portion of the braille-encoded characters encoding a plurality of numbers being distributed between a first row and a second row of the multiple rows; and
   additional information being braille-encoded in the second row.

19. A card, comprising:
   a substrate;
   multiple rows of braille-encoded characters formed on the substrate, at least a portion of the braille-encoded characters encoding a plurality of numbers being distributed between a first row and a second row of the multiple rows; and
   additional information being braille-encoded in a third row of the multiple rows.

* * * * *